Patented Oct. 14, 1947

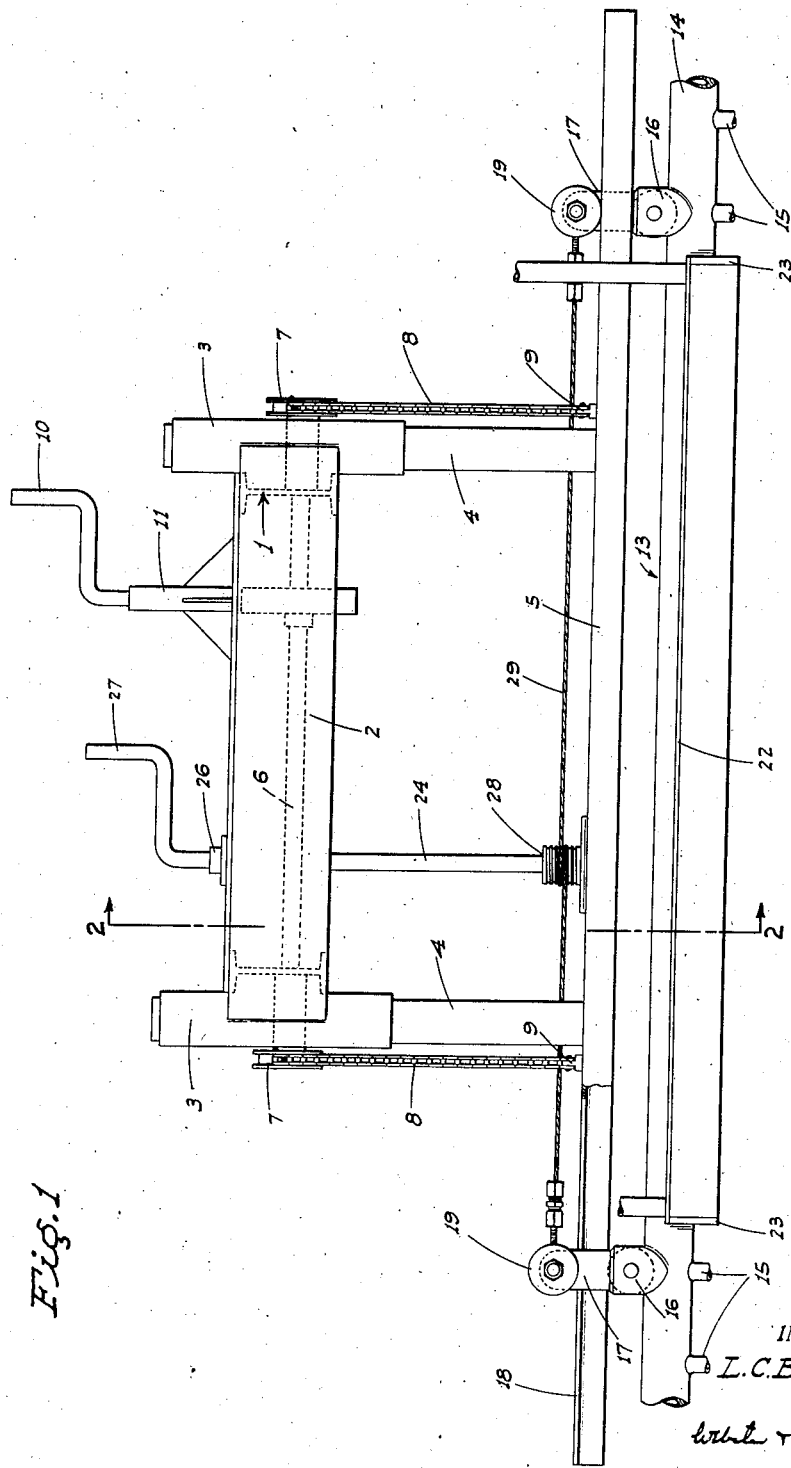

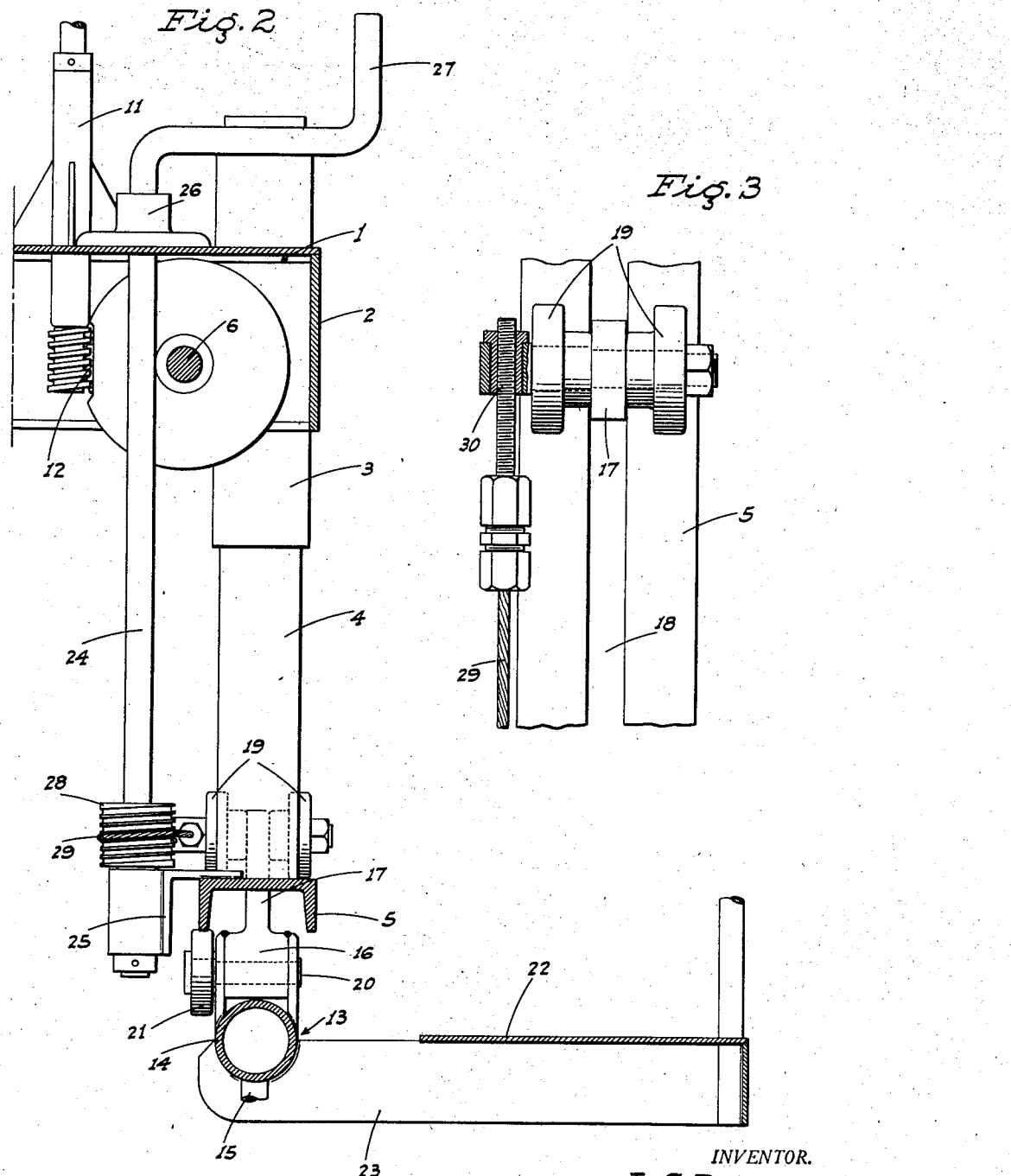

2,428,865

UNITED STATES PATENT OFFICE 2,428,865

ROAD OILER

Louis C. Brosemer, Sacramento, Calif.

Application December 5, 1945, Serial No. 632,884

1 Claim. (Cl. 299—34)

1

This invention relates in general to improvements in road oiling machines.

In particular the invention is directed to, and it is an object to provide, a novel adjustable mount for the spray bar unit whereby said spray bar unit can be adjusted vertically and transversely of the direction of travel, selectively. The present invention is intended to simplify the structure, and improve the operation, of the mount for the spray bar unit, as shown in U. S. Patent No. 2,329,331, dated September 14, 1943.

Another object of this invention is to provide an adjustable mount for the spray bar unit, which is designed to function smoothly and properly even when subjected to oil and dirt accumulated thereon as a result of operation of the machine.

A further object of the present invention is to provide an adjustable spray bar unit mount which includes a transverse supporting bar above the transverse spray bar unit, spaced roller carriages on the supporting bar and from which carriages the spray bar unit is suspended, and a cable system arranged to cause movement of the assembly of carriages and spray bar unit along said supporting bar and transversely of the direction of travel.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views:

Figure 1 is a rear end elevation illustrating the improved adjustable mount for the spray bar unit.

Figure 2 is an enlarged cross section on line 2—2 of Fig. 1.

Figure 3 is an enlarged fragmentary plan view of the supporting bar and one of the carriages, illustrating the manner of attachment of the control cable to said carriage.

Referring now more particularly to the characters of reference on the drawings, the numeral 1 indicates generally the main frame of a road oiling machine; said main frame being horizontal, projecting rearwardly, and including a horizontal cross beam 2.

Adjacent opposite ends of the cross beam 2 the main frame 1 supports a pair of vertical guide sleeves 3, through which vertical tubular posts 4 extend in slidable relation.

2

At their lower ends the posts 4 are fixed in connection with an elongated, transversely extending supporting bar 5 which is disposed horizontally. The supporting bar 5 is an inverted channel iron and is of such length that it extends, symmetrically, laterally outwardly beyond the posts 4 a substantial distance on opposite sides of the main frame 1.

Said supporting bar 5 is vertically adjustable by means of the following mechanism:

A cross shaft 6 is journaled in the main frame 1 adjacent the cross beam 2 thereof, and the ends of such cross shaft project laterally beyond opposite sides of the main frame and are there fixed with chain drums 7. Chains 8 are fixed in connection with said drums and depend to connection with the supporting bar 5, as at 9. An upstanding hand crank 10 is carried in a journal sleeve 11 on the cross beam 2, and a worm and pinion gear unit 12 connects said hand crank 10 to the cross shaft 6. Thus, upon rotation of the hand crank 10 in one direction or the other, rotation of the cross shaft 6 is accomplished, which results in winding the chains 8 either on or off of the drums 7, causing raising or lowering, selectively, of the supporting bar 5.

A spray bar unit, indicated generally at 13, extends transversely of the direction of travel below and parallel to the supporting bar, being adjustably suspended from the latter in the manner hereinafter described. The spray bar unit includes a heavy-duty section of pipe 14, from which a plurality of spaced nipples 15 depend. The nipples 15 are fitted, at their lower ends, with combination spray head and valve units (not shown), but which are of the type shown in the above identified patent.

Laterally outwardly of corresponding posts 4 the spray bar unit 13 is fitted with suspension members 16, each of which includes an upstanding or vertically elongated ear 17. The top of the supporting bar 5 is slotted lengthwise, as at 18, from adjacent each post 4 laterally outwardly to the corresponding outer end of said bar, and the ears 17 of the suspension members 16 project upwardly through said slots. At their upper ends the ears 17 are connected to double roller carriage units 19 which ride on top of said supporting bar 5. Each suspension member 16 also includes a cross pin 20, on the outer end of which a roller 21 is journaled, with said roller riding against the lower edge of one of the flanges of the channel shaped supporting bar 5.

By reason of the above arrangement the spray bar unit 13 is suspended from the supporting bar 5 for adjustment laterally of the direction of travel, but at the same time is prevented, by the described roller arrangement, from canting.

An operator's platform 22 is disposed to the rear of the spray bar unit 13 and is supported therefrom by transversely spaced brackets 23 by welding same to the pipe 14.

The spray bar unit 13 is adjustable along the supporting bar as follows:

A vertical shaft 24 is axially immovably but rotatably fixed in connection with the supporting bar 5 intermediate the posts 4 by means of a journal bracket 25. Adjacent its upper end the shaft 24 slidably extends through a journal 26 on the cross beam 2, and above said journal the shaft is formed with a hand crank 27.

Directly above the journal bracket 25 the shaft 24 is fitted with a drum 28 having a continuous helically cut cable groove in the face thereof, as clearly shown in Fig. 2. A cable 29 is looped about the drum 28 and thence extends in opposite directions to adjacent the double roller carriage units 19. Corresponding ends of said cable 29 are coupled to said carriage units 19 by adjustable attachment units 30.

When the road oiling machine is in use, and it is desired to raise or lower the spray bar unit 13 the hand crank 10 is actuated, which results in raising or lowering of the supporting bar 5 in the manner previously described.

To adjust the position of the spray bar unit 13 transversely of the direction of travel, the hand crank 27 is manipulated, causing rotation of the cable drum 28, with resulting movement of the cable in one direction or the other. When this occurs the double roller carriage units 19 are shifted along the supporting bar 5, carrying with them the spray bar unit.

The above described adjustable mount for the spray bar unit is not only simple and practical in its structure, but it is easy to operate, requires little servicing or maintenance, and will function effectively even in the presence of the oil or dirt to which the mechanism is subjected when the machine is in use.

While the flexible members 8 are here shown and described as being chains, it is obvious that cables may be employed instead, if desired.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, what is claimed as new and useful, and upon which Letters Patent are desired is:

A mount for the purpose described comprising a main supporting frame, a secondary frame which includes a fixed cross beam and a cross bar supported from said cross beam for relative vertical movement with respect thereto, a pair of spaced hangers mounted for relative traveling movement along said cross bar, a cable connecting said hangers, a pair of alined journal bearings, one bearing being fixed to the cross beam and the other fixed to the bar, a vertical shaft, said shaft being rotatably mounted in the bearing on the bar but axially immovable relative thereto, such shaft being rotatably mounted in the bearing on the cross beam and vertically slidable therethrough, a crank handle on the upper end of the shaft, and a drum on the shaft adjacent the cross bar, the cable being wound about said drum.

LOUIS C. BROSEMER.

REFERENCES CITED

The following references are of record in the file of this patent:

UNITED STATES PATENTS

| Number | Name | Date |
| --- | --- | --- |
| 839,024 | Nelson | Dec. 18, 1906 |
| 1,320,273 | Price | Oct. 28, 1919 |
| 2,329,311 | Brosemer | Sept. 14, 1943 |